(12) United States Patent
Zhong

(10) Patent No.: US 11,757,967 B2
(45) Date of Patent: **\*Sep. 12, 2023**

(54) VIDEO COMMUNICATIONS NETWORK WITH VALUE OPTIMIZATION

(71) Applicant: Agora Lab, Inc., Santa Clara, CA (US)

(72) Inventor: Sheng Zhong, Santa Clara, CA (US)

(73) Assignee: Agora Lab, Inc., Santa Clara, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/589,105

(22) Filed: Jan. 31, 2022

(65) Prior Publication Data

US 2022/0321625 A1 Oct. 6, 2022

Related U.S. Application Data

(63) Continuation of application No. 17/222,375, filed on Apr. 5, 2021, now Pat. No. 11,277,460.

(51) Int. Cl.
*H04L 65/75* (2022.01)
*H04L 43/0882* (2022.01)
*H04L 43/0894* (2022.01)
*H04L 41/0896* (2022.01)
*H04L 65/752* (2022.01)

(52) U.S. Cl.
CPC ........ *H04L 65/762* (2022.05); *H04L 41/0896* (2013.01); *H04L 43/0882* (2013.01); *H04L 43/0894* (2013.01); *H04L 65/752* (2022.05)

(58) Field of Classification Search
CPC ... H04L 65/752; H04L 65/756; H04L 65/762; H04L 65/764; H04L 65/765; H04L 43/0882; H04L 43/0894; H04L 43/0896; H04L 12/1827
See application file for complete search history.

(56) References Cited

U.S. PATENT DOCUMENTS

| | | | |
|---|---|---|---|
| 8,891,467 B2 * | 11/2014 | Awoniyi | H04W 72/1268 370/329 |
| 10,924,526 B2 * | 2/2021 | Zhao | H04L 65/80 |
| 11,146,599 B1 * | 10/2021 | Jackson | H04L 65/1101 |
| 11,277,460 B1 * | 3/2022 | Zhong | H04N 21/64792 |
| 2008/0084927 A1 * | 4/2008 | Rosenzweig | H04N 19/172 375/E7.145 |
| 2008/0101466 A1 * | 5/2008 | Swenson | H04N 21/2404 375/240.07 |
| 2011/0170410 A1 * | 7/2011 | Zhao | H04W 28/02 370/232 |

(Continued)

*Primary Examiner* — Jerry B Dennison
(74) *Attorney, Agent, or Firm* — Young Basile Hanlon & MacFarlane, P.C.

(57) ABSTRACT

Respective bandwidth information of respective connected devices of active media sessions are obtained. At least one additional media session is detected to have become active. A first total bandwidth of the at least one additional media session is determined. At least one scaling factor is determined using the respective bandwidth information and the first total bandwidth. The at least one scaling factor is transmitted to at least one connected device of the at least one of the respective connected devices. The at least one scaling factor is determined so as to keep a second total bandwidth of the active media sessions and the at least one additional media session below or equal an upper bandwidth limit of the communications network.

20 Claims, 4 Drawing Sheets

(56) References Cited

U.S. PATENT DOCUMENTS

| | | | |
|---|---|---|---|
| 2011/0292165 A1* | 12/2011 | Berger | H04L 65/403 |
| | | | 348/E7.083 |
| 2013/0195031 A1* | 8/2013 | Hessler | H04L 1/1819 |
| | | | 370/329 |
| 2013/0288653 A1* | 10/2013 | Zhao | H04W 72/04 |
| | | | 455/416 |
| 2017/0155870 A1* | 6/2017 | Zetterlund | H04N 7/15 |
| 2018/0097863 A1* | 4/2018 | Ivov | H04L 65/762 |
| 2018/0316741 A1* | 11/2018 | Hassan | H04L 41/5009 |
| 2020/0045587 A1* | 2/2020 | Choi | H04W 72/542 |
| 2020/0053141 A1* | 2/2020 | Zhao | H04L 41/0896 |
| 2021/0099916 A1* | 4/2021 | Dong | H04W 80/02 |
| 2022/0321625 A1* | 10/2022 | Zhong | H04L 43/0882 |

\* cited by examiner

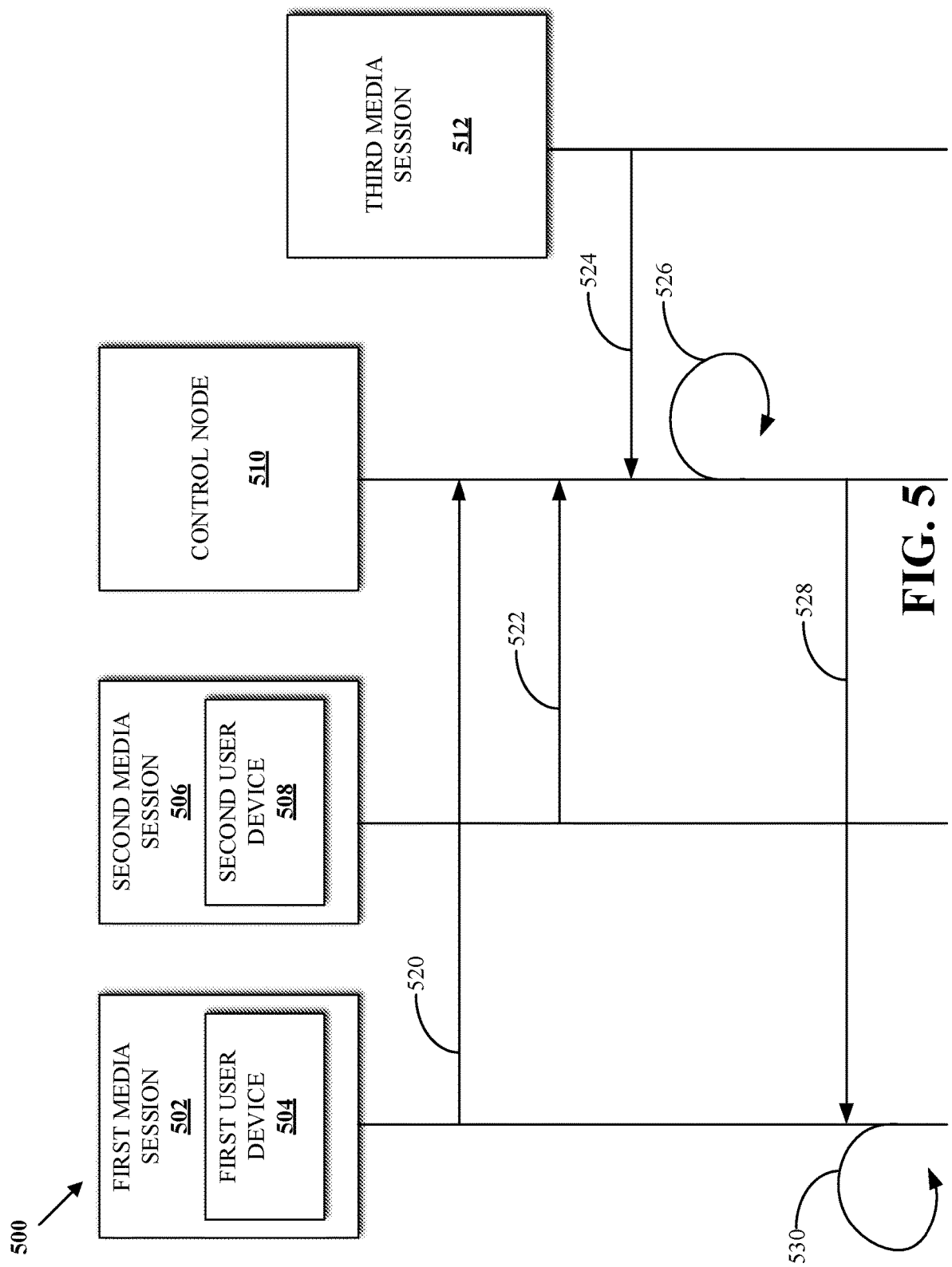

VIDEO COMMUNICATIONS NETWORK WITH VALUE OPTIMIZATION

CROSS-REFERENCE TO RELATED APPLICATION(S)

This application is a continuation of U.S. patent application Ser. No. 17/222,375 filed Apr. 5, 2021, the content of which is incorporated herein by reference in its entirety.

TECHNICAL FIELD

This disclosure relates to multimedia communications, and in particular, to bitrate adjustment based on an optimization of a value function.

BACKGROUND

Real-time multimedia (e.g., audio and/or video) communications have wide applications, such as conferences, live broadcasting, video chat sessions, webinars, and the like (collectively, media sessions). An entity (e.g., a for-profit organization, or a non-profit organization, a governmental agency, a financial institution, an educational institution, a social media platform, etc.) may deploy a video communications network (VCN) to enable its constituents to participate in media sessions. In a VCN, there could be many (e.g., thousands) of concurrently active media sessions.

A media stream (e.g., a video stream) can be generated at a source device (e.g., an user device equipped with audio/video (A/V) devices, such as a microphone and/or a camera) and transmitted to one or more other users. An encoder can compress the media stream using lossy compression to reduce the network load (e.g., the bandwidth required to transmit the media stream).

A communications network (e.g., a VCN) typically has a limited bandwidth. As the number of concurrently active communication sessions increases, the total traffic on the network may approach or exceed the limit of the network (e.g., the available bandwidth) and the network cannot gracefully handle (sudden) traffic increases.

SUMMARY

Disclosed herein are implementations of methods, apparatuses, and systems for real-time video communications.

A first aspect is a device that includes a memory and a processor. The processor is configured to execute instructions stored in the memory to obtain respective bandwidth information of respective connected devices of active media sessions; detect that at least one additional media session became active; determine a first total bandwidth of the at least one additional media session; determine at least one scaling factor using the respective bandwidth information and the first total bandwidth; and transmit the at least one scaling factor to at least one connected device of the at least one of the respective connected devices. The at least one scaling factor is determined so as to keep a second total bandwidth of the active media sessions and the at least one additional media session below or equal an upper bandwidth limit of the communications network.

A second aspect is a non-transitory computer readable medium storing instructions operable to cause one or more processors to perform operations to obtain a first uplink bandwidth of a first user device connected to a first media session; obtain a second uplink bandwidth of a second user device connected to a second media session; and, in response to detecting that a third media session is started, calculate at least one scaling factor using the first uplink bandwidth and the second uplink bandwidth, and transmit the at least one scaling factor to the first user device.

A third aspect is a method that includes encoding, at a device, a first portion of a media stream using a first value of an encoding parameter; transmitting bandwidth information of the device to a control node of a video communications network; receiving, from the control node, a scaling factor; scaling an uplink bandwidth of the device using the scaling factor to obtain a second bitrate; and encoding a second portion of the media stream using a second value of the encoding parameter that is different from the first value of the encoding parameter. The second value is obtained using the first value and the scaling factor.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 5 is an example of an interaction diagram for real-time video communications according to an implementation of this disclosure.

DETAILED DESCRIPTION

Figure 1:
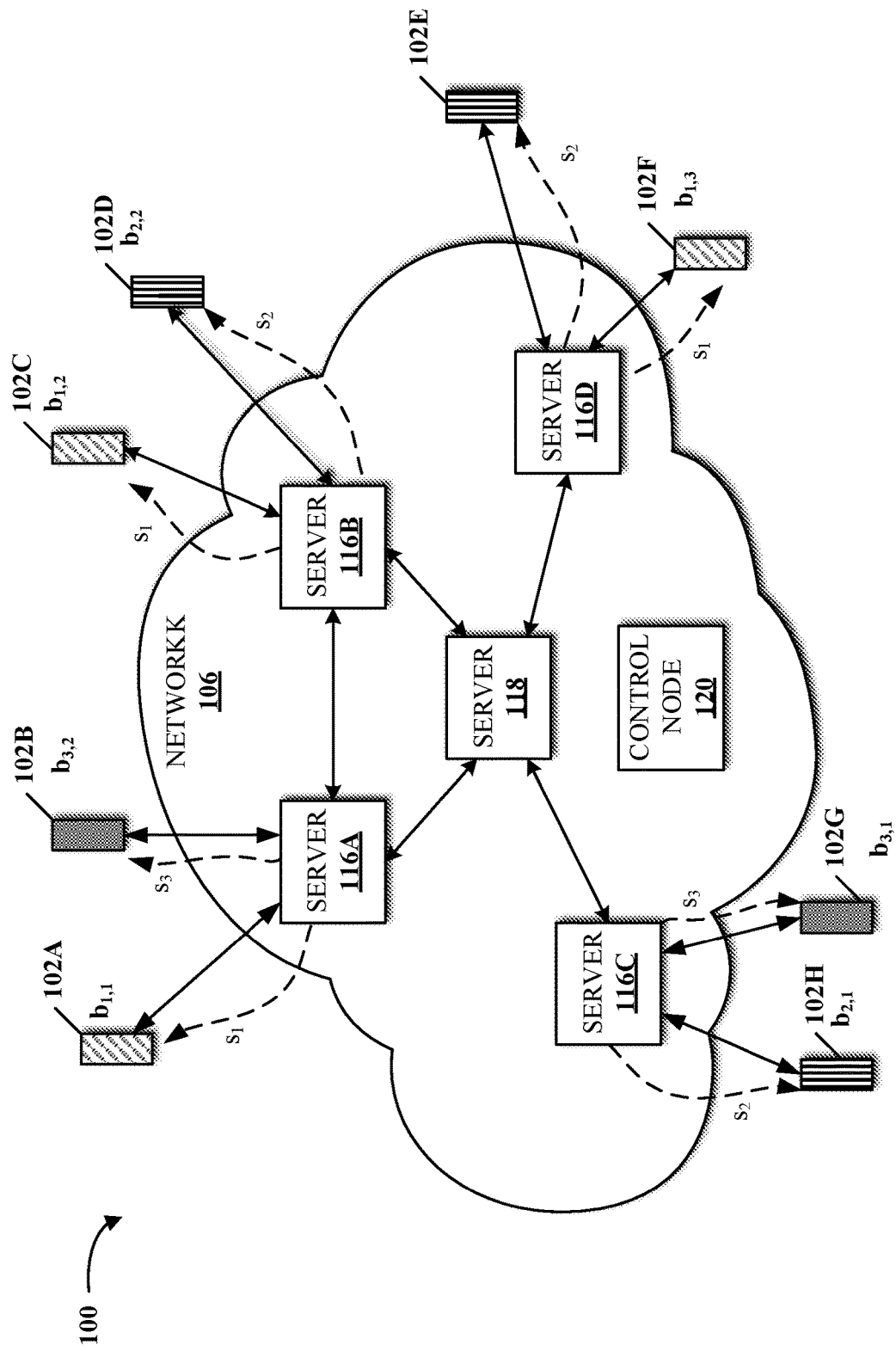
FIG. 1 is a diagram of an example of a system 100 (e.g., a VCN) for real-time video communications according to implementations of this disclosure.

In a communication network, and as mentioned above, many media sessions can be concurrently active at any point in time and many media sessions may start and others may terminate. Each media session can include several participants (e.g., users). More specifically, each participant may be connected to the media session using a user device, such as a computing device 200 of FIG. 2. Media content captured by (e.g., generated at, etc.) the user device (i.e., a source device) of one of the participants can be encoded (e.g., compressed) and transmitted to at least some of the other participants in the same media session.

Typically, lossy compression is used to reduce the load on the network and to reduce transmission time. As is known, lossy compression attempts to optimize a rate-distortion value. The rate-distortion value refers to a ratio that balances an amount of distortion (e.g., a loss in video quality of the media stream) with rate (e.g., a number of bits) for coding the media stream (e.g., a block or other video component). An encoder at a source device can compress the stream based on an available bandwidth or a desired bit rate. The bit rate is typically limited to or by an available upload bandwidth (i.e., uplink bandwidth or uplink bitrate) at/of the source device.

Techniques are known whereby the uplink bandwidth of the source device can be estimated and used by the encoder to set encoding parameters. For example, the source device can send multi-media packets of predetermined sizes to one or more receiving devices, receive responses (e.g., acknowledgement responses) from at least some of the one or more receiving devices, and, based on the received responses, the uplink bandwidth can be determined. As such, each source device can independently identify (e.g., calculate, determine, etc.) a bit rate to use while encoding the media stream. In another technique, each user device of a media session may be provisioned sufficient capacity (e.g., the uplink bandwidth) at what is referred to as "call setup" time.

A video communications network can only accommodate a number of media (e.g., video chat, etc.) sessions that consume at most the network's total bandwidth limit. Network bandwidth refers to the maximum amount of data that can be transmitted over the network per second. Said another way, the bandwidth of a network is given by the number of bits that can be transmitted over the network in a certain period of time.

When the total traffic over the network approaches the upper limit of the network (such as when new users join current media sessions or new media sessions including a number of users are started), the network may not be able to gracefully handle the (e.g., sudden) traffic increase. When insufficient network bandwidth is available, the Quality of Service (QoS) for the users of the media sessions suffers. For example, the throughput of the network, which is the actual amount of data that passes through the network, can suffer due to collisions, delays, and the like.

As the scale of the users increases, expectations of quality, capability, and acceptable quality of service of the network and system for supporting large-scale multimedia communications (e.g., a large number of media sessions) also become higher.

Reference is now briefly made to FIG. 1 to illustrate a current problem in a video communications network system. In FIG. 1, boxes of the same shading are assumed to be user devices participating in a same media session. Assume that at a current time, two media sessions are active: a first media session that includes user devices 102A, 102C, and 102F; and a second media session that includes user devices 102D, 102E, and 102H. Assume further that at the current time, the third media session that includes the user devices 102B and 102G is not started.

The total network capacity b that is used by the active first and second media sessions can be calculated using formula (1):

$$b = \sum_{k=1}^{N} \sum_{k=1}^{K_c} f_i^c(b_{c,i}) \text{ s.t. } b \leq B \qquad (1)$$

In formula (1), $b_{c,i}$ is the uplink bitrate (e.g., uplink video bitrate) of (e.g., allocated to, used by, etc.) device i in media session c; B is the upper limit of the network system bandwidth; $K_c$ is the number of user devices connected in session c; and $f_i^c$ is the bandwidth incurred by user i in session c. $f_i^c$ can be a function (e.g., a linear or some other function) of the uplink bitrate of the user device i. Thus, as described above with respect to FIG. 1, as there are 2 active media sessions (i.e., the first media session and the second media session), N=2. In the first media session, $K_c$=3 (i.e., the user devices 102A, 102C, and 102F); and in the second media session, Kc=3 (i.e., the user devices 102D, 102E, and 102H).

When a new media session (e.g., session N+1) is started, the new total network capacity b' that is used by all active sessions becomes:

$$b' = \sum_{k=1}^{N} \sum_{k=1}^{K_c} f_i^c(b_{c,i}) + \sum_{k=1}^{K_{N+1}} f_i^{N+1}(b_{N+1,i}) \qquad (2)$$

In formula (2), $K_{N+1}$ is the total number of user devices in the session N+1. For ease of reference, $$\sum_{k=1}^{K_{N+1}} f_i^{N+1}(b_{N+1,i})$$

is referred to as $\Delta_{new}$, the total capacity of a new media session.

$$\Delta_{new} = \sum_{k=1}^{K_{N+1}} f_i^{N+1}(b_{N+1,i}) \qquad (3)$$

To gracefully deal with the new session capabilities of new sessions, an entity deploying a communications network system may pre-anticipate and purchase network bandwidth to accommodate a maximum anticipated need. That is, the entity may pre-purchase enough bandwidth to deal with peak traffic demand. However, there are problems associated with such a strategy.

One such problem is that the amount of bandwidth increase needs to be known well in advance so that it can be purchased (e.g., leased, installed, etc.), such as from an Internet Service Provider (ISP). However, this is not always feasible as the increase may not be predictable or may come at a short notice. When such a sudden increase occurs and it surpasses the remaining available bandwidth of the VCN, the VCN system will be overly crowded and the system wide services will be compromised or will even be stalled or unavailable for many users.

Purchasing enough bandwidth for peak traffic demand can result in a significant amount of unused bandwidth during non-peak hours, which may be costly and wasteful. The larger the difference between the peak network traffic and the non-peak (e.g., typical, average, etc.) network traffic, the more wasteful this strategy is.

Another simple strategy (e.g., solution) may be to limit the increase to be within the allowable limit to safeguard the system, which may be done by a system administrator. For example, the demand can be reduced by managing the volume (e.g., number of concurrent media sessions) so that a limited number of media sessions can occur simultaneously across each link. To illustrate, if an office has three video conferencing units, but the bandwidth of the link from the office can only support two simultaneous media sessions, a scheduling policy can be put in place to insure that only two of the video conferencing units are being used concurrently. However, this strategy frustrates users and significantly reduces the QoS.

Implementations according to this disclosure solve the above problem(s) while maintaining an acceptable QoS by scaling back existing video transmission services (i.e., media sessions) to make room (i.e., make bandwidth available) for the new media sessions. As such, a VCN continues to scale gracefully as new media sessions are started and/or as new users are added to media sessions. Implementations according to this disclosure, and as further described below, calculate one or more scaling factors, which are communicated back to respective user devices. The respective user devices (or encoders therein) can use the one or more scaling factors to adjust encoding parameters to reflect/accommodate the additional load on the network. In some implementations, the scaling factors can be calculated by optimizing a value function (e.g., an objective function) that is related to or reflects the user experience of the users participating in media sessions.

As compared to techniques where each user device (e.g., an encoder therein) identifies an uplink bandwidth to adjust encoding parameters, implementations according to this disclosure result in encoding parameters at the user devices being adjusted based on a wholistic view of all the media sessions and, therefore, the bandwidth demand on the network as a whole.

FIG. 1 is a diagram of an example of a system 100 (e.g., a VCN) for real-time video communications according to implementations of this disclosure. The system 100 includes multiple devices or apparatuses, such as user devices 102A-102H which communicate (e.g., send and receive real-time media content) via servers 116A-116D and a server 118 of a network 106 (which may also be referred to as the VCN). The servers 116A-116D and the server 118 may be referred to collectively as "the servers" or "service nodes." The system 100 also includes a control node 120. In some implementations, the control node 120 can be one or more of the servers 116A-116D or the server 118. The control node 120 can be used for controlling the network traffic, such as by providing to at least some of the user devices 102A-102H, respective scaling factors, as further described below. While FIG. 1 shows only a certain number of devices, servers, and networks, as can be appreciated, more or fewer of each can be included in the system 100.

In some implementations, the system 100 can be implemented using general-purpose computers with a computer program that, when executed, carries out the methods, algorithms, processes, and/or instructions described herein. It should be noted that parts or components of the computing device 200 of FIG. 2 can include elements not limited to those shown in FIG. 2.

Each of the user devices 102A-102H, the servers 116A-11D, the server 118, and the control node 120 can be implemented by or can be any number of any configuration of computers, such as a microcomputer, a mainframe computer, a supercomputer, a general-purpose computer, an integrated computer, a database computer, or a remote server computer. A user device of the user devices 102A-102H can be any end-user device capable of multimedia communications such as a smartphone, a camera, a desktop computer, a laptop computer, a workstation computer, a tablet computer, a cell phone, a personal data assistant (PDA), a wearable computing device, or a computing device provided by a computing service provider (e.g., a web host or a cloud service provider). Each or some of the user devices 102A-102H, the servers 116A-116D, the server 118, and the control node 120 can have a hardware configuration as shown by the computing device 200 of FIG. 2. However, other configurations are possible.

The network 106 can be any combination of any suitable type of physical or logical networks, such as a wireless network, a wired network, a local area network (LAN), a wide area network (WAN), a virtual private network (VPN), a cellular data network, a Bluetooth network, an infrared connection, an NFC connection, or the Internet. The network 106 can be considered to be an infrastructure for facilitating (e.g., enabling, carrying out, etc.) media sessions. The network 106 can include many other components other than those described below. For example, the network 106 can include components or services for signaling, network address translation (NAT), firewall traversal, identity verification, routing, and the like.

The servers of the network 106 can be interconnected with each other. The servers can also be connected to user devices. A server directly connected to a user device can be referred to as an "edge server." Each of the servers 116A-116D is an edge server because it is directly connected to at least one user device. For example, the server 116A is shown as being directly connected to the user devices 102A-102B, the server 116D is shown as being directly connected to the user devices 102E-102F, and so on. The server 118 is a non-edge server.

In this disclosure, the term "directly connected" refers to establishing a connection between a first node and a second node in a network via no intermediate, routing, or forwarding node(s). That is, the direct connection can cause data to be sent and received between the first node and the second node without assistance or facilitation of any other node of the network. It should be noted that the "direct connection" is at the application level of the network, and establishing the "direct connection" does not exclude using assistant or facilitating apparatuses or devices, such as a gateway, a router, a switchboard, or any other routing or forwarding devices or apparatuses that do not function as application-level nodes of the network.

The network 106 can include multiple edge servers and non-edge servers. It should be noted that edge servers can be directly or indirectly connected to each other in the network 106. For example, servers 116A and 116B are shown as being directly connected, and servers 116A and server 116D are shown as being indirectly connected. It should also be noted that multiple user devices can be connected to the same edge server. While, as to not clutter FIG. 1, the control node 120 is not visually depicted as being connected to any other computing device, the control node 120 is in fact directly or indirectly connected to the computing devices of the system 100.

The servers can receive, forward, and deliver multimedia data (such as data of media sessions) from and to different user devices. Though not fully shown in FIG. 1, the servers and the control node(s) can be interconnected with each other. That is, any two nodes in the network 106 can be directly connected. Some connections between the nodes can be bidirectional. Some other connections between the nodes can be unidirectional. A router node, such as the server 118, is not directly connected to any user device. The router node participates in forwarding data. In some implementations, a service node can switch between roles of an edge node and a router node at different time, or function as both at the same time. In some implementations, an edge node can be connected to an autonomous system (AS) operated by an Internet service provider (ISP).

Figure 2:
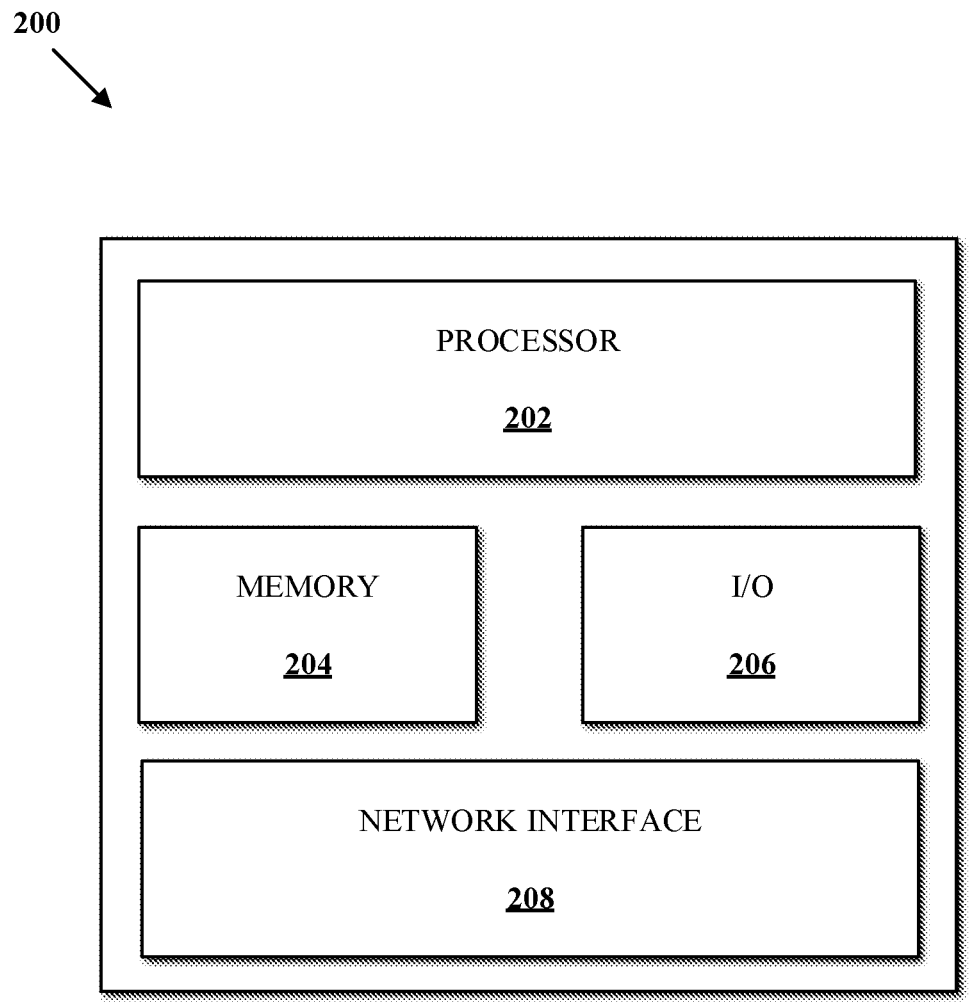
FIG. 2 is an example of a computing device according to implementations of this disclosure.

FIG. 2 is an example of a computing device 200 according to implementations of this disclosure. The computing device 200 can include a processor 202, a memory 204, an input/output (I/O) device 206, and a network interface 208.

The processor 202 can be any type of device capable of manipulating or processing information. In some implementations, the processor 202 can include a central processor (e.g., a central processing unit or CPU). In some implementations, the processor 202 can include a graphics processor (e.g., a graphics processing unit or GPU). Although a single processor is shown, the computing device 200 can use multiple processors. For example, the processor 202 can include multiple processors distributed across multiple machines (each machine having one or more processors) that can be directly coupled or indirectly connected via a network (e.g., a local area network).

The memory 204 can include any transitory or non-transitory device capable of storing codes and data that can be accessed by the processor (e.g., via a bus). The memory 204 herein can be a random-access memory (RAM), a read-only memory (ROM), an optical/magnetic disc, a hard disk, a solid-state drive, a flash drive, a security digital (SD) card, a memory stick, a compact flash (CF) card, or any combination of any suitable type of storage device. In some implementations, the memory 204 can be distributed across multiple machines, such as in the case of a network-based memory or cloud-based memory. The memory 204 can store data (not shown), an operating system (not shown), and one or more applications (not shown). The data can include any data for processing (e.g., an audio stream, a video stream, or a multimedia stream). The applications can include one or more programs that permit the processor 202 to implement instructions to generate control signals for performing functions of the techniques in the following description. An application can include or can be an encoder that encodes a media stream to be transmitted to another apparatus. An application can include or can be a decoder that receives a compressed media stream, decodes (i.e., decompresses) the compressed media stream and stores or displays the media stream at the computing device 200. An application can be or can include one or more techniques for calculating scaling factors of uplink bandwidths.

In some implementations, the computing device 200 can further include a secondary (e.g., external) storage device (not shown). The secondary storage device can provide additional memory when high processing needs exist. The secondary storage device can include any suitable non-transitory computer-readable medium, such as a memory card, a hard disk, a solid-state drive, a flash drive, or an optical disc. Further, the secondary storage device can be a component of the computing device 200 or a shared device accessible by the computing device 200 via a network. In some implementations, the application in the memory 204 can be stored in whole or in part in the secondary storage device and loaded into the memory 204 as needed for processing.

The I/O device 206 can be implemented in various ways. For example, the I/O device can include a display that coupled to the computing device 200 and configured to display a rendering of graphics data. The I/O device 206 can be any device capable of transmitting a visual, acoustic, or tactile signal to a user, such as a display, a touch-sensitive device (e.g., a touchscreen), a speaker, an earphone, a light-emitting diode (LED) indicator, or a vibration motor. The display can be a liquid crystal display (LCD), a cathode-ray tube (CRT), or any other output device capable of providing a visual output to an individual. The I/O device 206 can also be any device capable of receiving a visual, acoustic, or tactile signal from a user, such as a keyboard, a numerical keypad, a mouse, a trackball, a touch-sensitive device (e.g., a touchscreen), a sensor, a microphone, a camera, or a gesture-sensitive input device. In some cases, an output device can also function as an input device, such as a touchscreen display configured to receive touch-based input.

The network interface 208 can be used to communicate signals and/or data with another device (e.g., via a communication network, such as the network 106). For example, the network interface 208 can include a wired means for transmitting signals or data from the computing device 200 to another device. For another example, the network interface 208 can include a wireless transmitter or receiver using a protocol compatible to the wireless transmission. The network interface 208 can be implemented in various ways, such as a transponder/transceiver device, a modem, a router, a gateway, a system-on-chip (SoC), a wired (e.g., RJ-45) network adapter, a wireless (e.g., Wi-Fi) network adapter, a Bluetooth adapter, an infrared adapter, a near-field communications (NFC) adapter, a cellular network antenna, or any combination of any suitable type of device capable of providing functions of communications with the network 106. In some implementations, the network interface 208 can be a generic or general-purpose network interface that is not dedicated to a specialized network and not adapted to a specialized (e.g., closed-source, proprietary, non-open, or non-public) network protocol. For example, the network interface can be a general network interface that supports the Transmission Control Protocol/Internet Protocol (TCP/IP) communications protocol family (or "suite"). For another example, the network interface can be a general network interface that only supports the TCP/IP communications protocol family. It should be noted that the network interface 208 can be implemented in various ways and not limited to the aforementioned examples.

Without departing from the scope of this disclosure, the computing device 200 can include more or fewer of parts, components, hardware modules, or software modules for performing functions of real-time multimedia communications.

Figure 3:
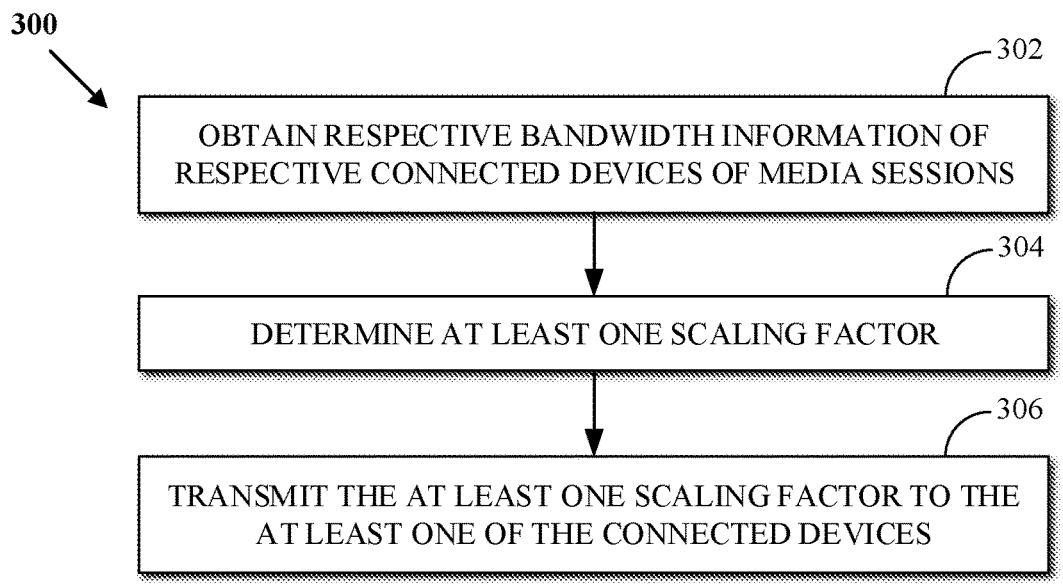
FIG. 3 is a flowchart of an example of a technique for real-time video communications according to an implementation of this disclosure.

FIG. 3 is a flowchart of an example of a technique 300 for real-time video communications according to an implementation of this disclosure. The technique 300 can be used in a communications network (e.g., a VCN), such as the network 106 of FIG. 1. The technique 300 can be implemented as software and/or hardware modules in the system 100 in FIG. 1. For example, the technique 300 can be implemented as software modules of a control node, such as the control node 120 of FIG. 1. For another example, the software modules implementing the technique 300 can be stored in a memory, such as the memory 204 of FIG. 2 and which can be the memory of the control node, as instructions and/or data executable by a processor, such as the processor 202 of FIG. 2 and which can be a processor of the control node.

The technique 300 can be executed at any time and/or periodically to determine (e.g., calculate, etc.) at least one scaling factor. In another example, the technique 300 can be executed when a new media (e.g., video communications) session joins (e.g., starts, etc.). In another example, the technique 300 can be executed when the number of current (e.g., concurrent) users in existing (e.g., currently active) media session increases. In another example, the technique 300 can be executed when the traffic of the new session(s) is significant and/or the number of current users in an active media session significantly increases such that any additional bandwidth required by the new users or sessions cannot be accommodated by the remaining system bandwidth. In these cases, the at least one scaling factor can be in the range (0, 1).

In another example, the technique 300 can be executed when a media session is disconnected (e.g., when the number of active media sessions decreases) or when the number of current users in existing media session decreases. In these cases, the at least one scaling factor can be greater than 1 as long as the total bandwidth constraints of the below equations are met (e.g., the total bandwidth does not exceed the upper limit of the network system bandwidth, B As such, in an example, the technique 300 can include detecting, at the control node, a change to the media sessions. The change to the media sessions can be or can include at least one of a first change of a number of the (active) media sessions or a second change of a number of users in at least one of the (active) media sessions.

At block 302, the technique 300 obtains respective bandwidth information of respective connected devices (i.e., user devices) of media sessions. As used in this disclosure, "obtain" can mean to form, produce, select, identify, construct, determine, receive, specify, generate, or other obtain in any manner whatsoever. The respective bandwidth information can be received at the control node.

In an example, obtaining the respective bandwidth information can include obtaining, at the control node, respective uplink bitrate values (e.g., $b_{c,i}$ as described above with respect to formula (1)) from the connected devices; and calculating the respective bandwidth information using the respective uplink bitrate values. The respective bandwidth information can be calculated as a function (e.g., $f_i^c$) of the respective uplink bitrate values. The function can be a linear function. The function can take into account the fact that not all data transmitted from a user device is media data. For example, some of the data transmitted may be overhead related to a protocol (e.g., TCP/IP overhead, WebRTC overhead, etc.) that is used by the user device. In an example, the function can account for the fact that other application data may be transmitted from the user device in addition to media data related to a media session. The traffic incurred by each uplink $b_{c,i}$, can depend on factors such as the number of receivers that the traffic is sent to, the routes that the traffic is sent along to these receivers, other factors, or a combination thereof. Additionally, at least some of the routing paths can be shared; or at least some of the routes may be subject to congestion or packet loss and, as such, can only transmit part of the of data. The VCN system (e.g., the control unit) can take at least some of these factors into consideration when determining the functions $f_i^c$. In another example, the function $f_i^c$ may simply be set to $f_i^c = b_{c,i}$ In yet another example, the function $f_i^c$ can additionally or instead use downlink bitrate values.

In an example, at least some (e.g., each) of the user devices participating in the active media sessions, can transmit their respective uplink bitrates to the control node. In another example, the control node can poll the at least some of the user devices or the edge servers connected to the at least some of the user devices for the respective uplink bitrates. In another example, the maximum allowed uplink bitrate per user device can be initially obtained by the control node when a user device joins a media session. Such information can be obtained from a server that contains such information. For example, the uplink bitrates can be obtained from respective edge servers connected to the user devices participating in the active media sessions.

At block 304, the technique 300 determines at least one scaling factor of a respective bandwidth of at least one of the respective connected devices of a media session of the media sessions.

In an example, the at least one scaling factor can be one uniform scaling factor. That is, all active media sessions (e.g., active video transmission services) can be scaled back uniformly (e.g., similarly, using the same scaling factor, etc.) to make room for the new services (e.g., the new media session or the new user devices). The one uniform scaling factor, s, can be obtained as a solution to the optimization problem of equation (5). When a new media session is added (i.e., the number of sessions is increased from N to (N+1)), then formula (2) above gives the following where it is desired that new total network capacity b' remains below or equal to B, the upper limit of the network:

$$b' = \sum_{c=1}^{N+1} \sum_{i=1}^{K_c} f_i^c(b_{c,i}) \text{ s.t. } b' \leq B \qquad (4)$$

Thus, the bandwidth use for each of the current sessions must be scaled back by scaling factor s. Formula (4) can then be rewritten as the optimization problem of equation (5):

$$b' = \left[ s * \sum_{c=1}^{N} \sum_{i=1}^{K_c} f_i^c(b_{c,i}) \right] + \Delta_{new} = \left[ \sum_{c=1}^{N} \sum_{i=1}^{K_c} f_i^c(s * b_{c,i}) \right] + \Delta_{new} \qquad (5)$$

$$\text{if } s \leq \frac{B - \Delta_{new}}{B}, \text{ then } b' \leq B$$

As such, the at least one scaling factor can be determined (e.g., calculated, etc.) using a total bandwidth of the communication network (i.e., the upper limit of the network B) and a total capacity of one of the media sessions (e.g., the total capacity of the new media session). In the case that a media session is terminated, then the optimization problem of (5) becomes if s≤

$$\frac{B + \Delta_{new}}{B}$$

where b'≤B and where $\Delta_{new}$ is the total capacity of the media session just terminated.

If the current media sessions include a first media session, a second media session, and other media sessions, then the at least one scaling factor, s, can be transmitted to each of the first media session, the second media session, and at least some of the other media sessions. Transmitting the at least one scaling factor to a media session means transmitting the at least one scaling factor to each user device of the media session.

In another example, at least some (e.g., each) of the media sessions can be scaled independently. As such, determining the at least one scaling factor can include obtaining respective scaling factors for the at least some of the media sessions by optimizing a total value that is a combination of respective value functions of the media sessions. As further described below, each of the respective value functions can use a respective scaling factor and respective bit rates of user devices of the media session as parameters. A value function can be for a user of a media session. The sum of the values of all the users in a session can be the total value of that session. The total value of the VCN can be the sum of the values of all the sessions.

That is, instead of a uniform scaling factor, a respective scaling factor $s_c$ can be obtained for each media session to be scaled. Thus, formula (2) can be rewritten as:

$$b' = \sum_{c=1}^{N} \left\{ s_c * \sum_{i=1}^{K_c} f_i^c(b_{c,i}) \right\} + \Delta_{new} = \sum_{c=1}^{N} \sum_{i=1}^{K_c} f_i^c(s_c * b_{c,i}) + \Delta_{new} \qquad (6)$$

$$\text{s.t. } b' \leq B; s_c \leq 1.0, \forall c \in \{1, \ldots, N\}$$

According to equation (6), each current media session c(c=1, . . . , N) is scaled using a corresponding scaling factor $s_c$ so that the total network capacity b' of the current media sessions and the new media session can still be less than or equal to the upper limit of the network system bandwidth, B.

To calculate the scaling factors $s_c$, a value function (e.g., an objective function) can be defined and used. The value function can reflect the user experience (i.e., user perception of the performance and/or video quality of the received media content). The user experience usually depends heavily on the bit rate of the bit stream the user is viewing (e.g., receiving). For example, a higher bit rate can allow an encoder to generate higher resolution compressed video and/or a higher frame rate video to be encoded for transmission over the network.

To reiterate, the value function or the user experience can be a function of the bit rate. In another example or additionally, the value function can be or can further include the price rate for a given service level. The price rate may also be a function of the bit rate. The value function can be represented by $r_i^c(b_{c,i})$ in formula (7) to calculate the total value of all the active media sessions $$r = \sum_{k=1}^{N+1} \sum_{i=1}^{Kc} r_i^c(b_{c,i}) \quad (7)$$

The respective scaling factors $s_c$ can be obtained by solving the optimization problem of (8), which can be solved using any known methodology. For example, linear programming or dynamic programming may be used to solve the optimization problem of (8).

$$\begin{cases} r' = \max_{s_c} \sum_{k=1}^{N+1} \sum_{i=1}^{Kc} r_i^c(s_c * b_{c,i}) \\ \text{s.t. } b' \leq B; s_c \leq 1.0, \forall c \in \{1, \ldots, N+1\} \\ \text{where } b' = \sum_{k=1}^{N+1} \sum_{i=1}^{Kc} f_i^c(s_c * b_{c,i}) \end{cases} \quad (8)$$

At block 306, the technique 300 transmits the at least one scaling factor to the at least one of the connected devices. The at least one scaling factor can be transmitted from the control node to a connected device via the edge server to which the connected device is connected. As illustrated in FIG. 1 in the case of respective scaling factors $s_c$, scaling factor $s_1$ of the first media session is transmitted to the user devices 102A, 102C, and 102F; scaling factor $s_2$ of the second media session is transmitted to the user devices 102D, 102E, and 102H; and scaling factor $s_3$ of the new media session is transmitted to the user devices 102B and 102G. The scaling factors $s_c\{c=1, \ldots, N+1\}$ are passed from the control node to the corresponding video encoding engines in the user devices and are utilized to scale the video coding bitrates. That is, the at least one of the connected devices uses the scaling factor to adjust an available bandwidth. As already mentioned, the at least one of the connected devices uses the scaling factor to adjust encoding parameters of the media session. In an example, a connected device of the connected devices can determine a bit rate for encoding using the scaling factor and an estimated bandwidth that is available to the connected device and which the connected device (a technique therein) estimates (e.g., calculates, determines, etc.). In an example, the connected device may not use an estimated bandwidth for determining the encoding bitrate. As such, instead of sending the scaling factor, it is possible to send the scaled bit rate itself to the connected device.

Figure 4:
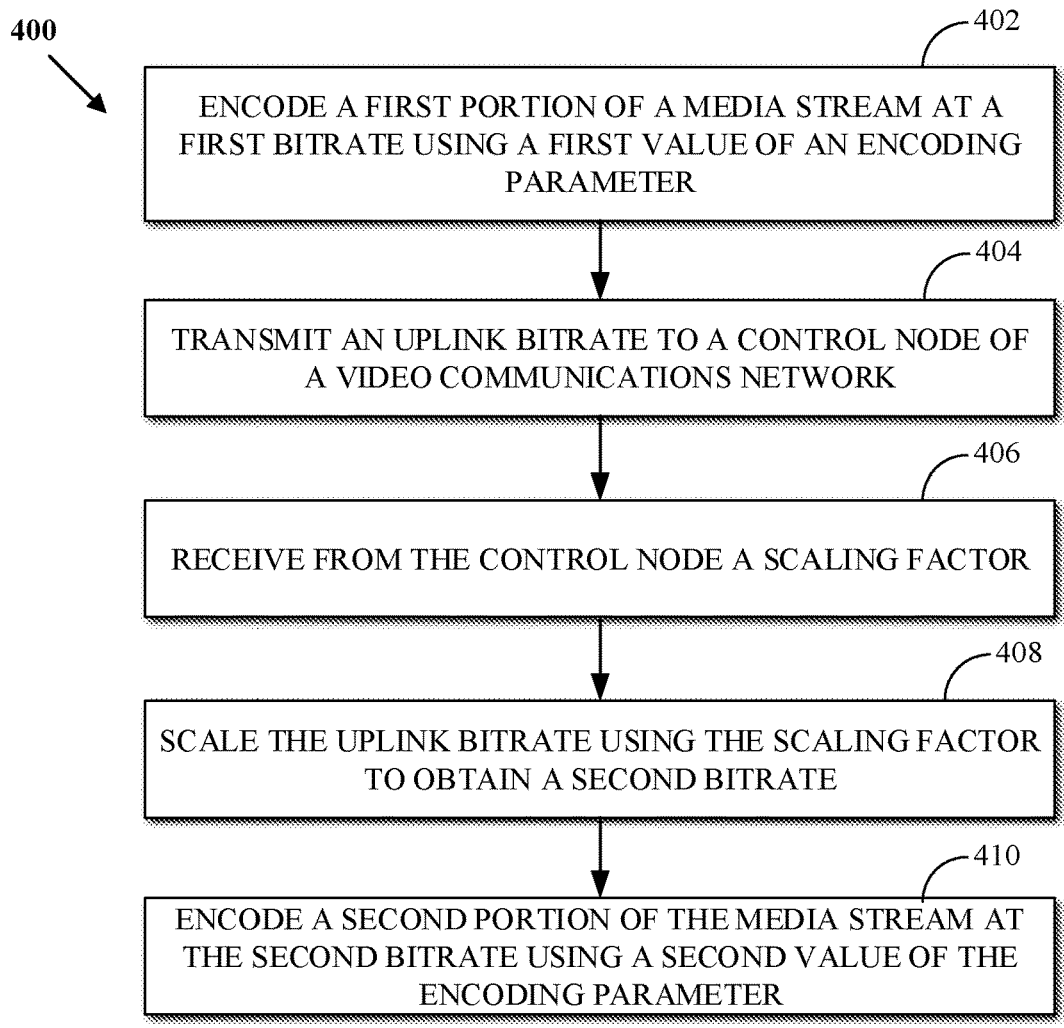
FIG. 4 is a flowchart of an example of a technique for real-time video communications according to an implementation of this disclosure.

FIG. 4 is a flowchart of an example of a technique 400 for real-time video communications according to an implementation of this disclosure. The technique 400 can be implemented by a device that is connected to a network (e.g., a video communications network), such as the network 106 of FIG. 1, to participate in media sessions. For example, a media stream captured or generated at the device can be encoded by an encoder (e.g., a video and/or an audio encoder) of the device for transmission, via the network, to one or more receiving devices.

The technique 400 can be implemented, for example, as a software program that may be executed a computing device, such as one or more of the user devices 102A-102H of FIG. 1 or the computing device 200 of FIG. 2. The software program can include machine-readable instructions that may be stored in a memory such as the memory 204 or the secondary storage, and that, when executed by a processor, such as the processor 202, may cause the computing device to perform the technique 400. The technique 400 can be implemented using specialized hardware or firmware. Multiple processors, memories, or both, may be used.

At block 402, the techniques 400 encodes a first portion of the media stream at a first bitrate using a first value of an encoding parameter. The first bitrate can be or can be based on an uplink bandwidth of the device. In an example, the uplink bandwidth can be the bandwidth available to the device for uploading media content (e.g., video content) to the network.

At block 404, the technique 400 transmits the uplink bandwidth of the device to a control node of a video communications network. The control node can be the control node 120 of FIG. 1. In an example, the uplink bandwidth can be transmitted to the control node in response to receiving a request from the control node. In an example, the uplink bandwidth can be transmitted to the control node at a regular interval (e.g., every one second, ½ second, or some other interval). In an example, the uplink bandwidth of the device can be transmitted to the control node by an edge server connected to the device.

At block 406, the technique 400 receives from the control node a scaling factor. The scaling factor can be one of the scaling factors s or the scaling factor $s_c$, as described above. The scaling factor $s_c$ is the scaling factor for the media session that the device is participating in. It is noted that the device can be participating in multiple media sessions simultaneously. As such, a respective scaling factor can be received for each of the media sessions.

At block 408, the technique 400 scales the uplink bandwidth using the scaling factor to obtain a second bitrate. Scaling can simply mean multiplying the uplink bandwidth by the scaling factor to obtain the second bitrate. However, other ways of obtaining the second bitrate using the scaling factor and the uplink bandwidth are possible. As mentioned above, the scaling factor can be in the range (0, 1) or can be greater than 1. As such, in an example, the second bitrate would be smaller than the first bitrate when the scaling factor is in the range (0, 1).

At block 410, the technique 400 encodes a second portion of the media stream at the second bitrate using a second value of the encoding parameter. The encoding parameter can be at least one of a frame rate or frame resolution. As such, the second portion of the media stream can be encoded using a smaller frame rate and/or a smaller resolution when the scaling factor is in the range (0, 1).

FIG. 5 is an example of an interaction diagram 500 for real-time video communications according to an implementation of this disclosure. The interaction diagram 500 can be implemented in a system, such as the system 100. The interaction diagram 500 includes a first media session 502 in which a first user device 504 is a participant, a second media session 506 in which a second user device 508 participates, and a control node 510. The first media session 502 and the first user device 504 are currently active media sessions and can be, respectively, the first media session and the second media session as described with respect to FIG. 1. The first user device 504 can be one or more of the user devices 102A, 102C, or 102F; and the second user device 508 can be one or more of user devices 102D, 102E, or 102H. The control node 510 can be control node 120 of FIG. 1. The interaction diagram 500 also includes a third media session 512, which is started at a later time than the currently active media sessions (e.g., the first media session 502 and the second media session 506).

At 520, the control node 510 receives a first uplink bandwidth of the first user device 504; and, at 522, the control node 510 receives a second uplink bandwidth of the second user device 508. In an example, the control node 510 requests the first uplink bandwidth and the second uplink bandwidth. In an example, the first user device 504 and the second user device 508 transmit the first uplink bandwidth and the second uplink bandwidth, respectively, without being prompted to do so by the control node 510. In an example, the control node 510 can obtain the first uplink bandwidth and the second uplink bandwidth from one or more other devices (e.g., servers) that contain and/or can derive the first uplink bandwidth and the second uplink bandwidth.

At 524, the control node detects that the third media session 512 has been started. At 526, in response to detecting that the third media session 512 started, the control node 510 calculates at least one scaling factor using the first uplink bandwidth and the second uplink bandwidth; and, at 528, the control node transmits the at least one scaling factor to the first user device. At 530, the first user device 504 uses the at least one scaling factor to modify encoding parameters of an encoder used with the first media session.

In an example, the same at least one scaling factor can also be transmitted to the second user device 508. In an example, the at least one scaling factor includes a first scaling factor for the first media session and a second scaling factor for the second media session that is different from the first scaling factor. The control node 510 can transmit the first scaling factor to the first user device 504 and transmit the second scaling factor to the second user device 508. A third user device (not shown) can be connected to (e.g., participates in, etc.) the first media session. As such, the control node 510 can also transmit the first scaling factor to the third user device. In an example, a new media session may be started at a fourth user device and a new scaling factor, calculated according to one of equations (5) or (8), can be transmitted to the fourth user device.

In an example, the control node 510 calculates the at least one scaling factor by calculating the at least one scaling factor using a total bandwidth of a communication network and a capacity of the third media session. In an example, the at least one scaling factor is calculated such that a new total network capacity is less than or equal to upper limit of a network system bandwidth. The new total network capacity includes a first total capacity of the first media session, a second total capacity of the second media session, and a third total capacity of the third media session.

Calculating the at least one scaling factor using the first uplink bandwidth and the second uplink bandwidth can be or can include optimizing a value that measures a user experience, as described above. The value that measures the user experience can be a function of bit rate.

As described above, a person skilled in the art will note that all or a portion of the aspects of the disclosure described herein can be implemented using a general-purpose computer/processor with a computer program that, when executed, carries out any of the respective techniques, algorithms, and/or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASIC s), field-programmable gate arrays (FPGAs), programmable logic arrays, optical processors, programmable logic controllers, microcode, microcontrollers, servers, microprocessors, digital signal processors, or any other suitable circuit. In the claims, the term "processor" should be understood as encompassing any of the foregoing, either singly or in combination.

The aspects of the disclosure described herein can be described in terms of functional block components and various processing operations. The disclosed processes and sequences may be performed alone or in any combination. Functional blocks can be realized by any number of hardware and/or software components that perform the specified functions. For example, the described aspects can employ various integrated circuit components, such as, for example, memory elements, processing elements, logic elements, look-up tables, and the like, which can carry out a variety of functions under the control of one or more microprocessors or other control devices. Similarly, where the elements of the described aspects are implemented using software programming or software elements, the disclosure can be implemented with any programming or scripting languages, such as C, C++, Java, assembler, or the like, with the various algorithms being implemented with any combination of data structures, objects, processes, routines, or other programming elements. Functional aspects can be implemented in algorithms that execute on one or more processors. Furthermore, the aspects of the disclosure could employ any number of conventional techniques for electronics configuration, signal processing and/or control, data processing, and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as nontransitory memory or media and can include RAM or other volatile memory or storage devices that can change over time. A memory of an apparatus described herein, unless otherwise specified, does not have to be physically contained in the apparatus, but is one that can be accessed remotely by the apparatus, and does not have to be contiguous with other memory that might be physically contained in the apparatus.

Any of the individual or combined functions described herein as being performed as examples of the disclosure can be implemented using machine-readable instructions in the form of code for operation of any or any combination of the aforementioned hardware. The computational codes can be implemented in the form of one or more modules by which individual or combined functions can be performed as a computational tool, the input and output data of each module being passed to/from one or more further modules during operation of the methods and systems described herein.

The terms "signal" and "data" are used interchangeably herein. Further, portions of the computing devices do not necessarily have to be implemented in the same manner. Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. Moreover, use of the term "an aspect" or "one aspect" throughout this disclosure is not intended to mean the same aspect or implementation unless described as such.

As used in this disclosure, the term "or" is intended to mean an inclusive "or" rather than an exclusive "or" for the two or more elements it conjoins. That is, unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. Similarly, "X includes one of A and B" is intended to be used as an equivalent of "X includes A or B." The term "and/or" as used in this disclosure is intended to mean an "and" or an inclusive "or." That is, unless specified otherwise or clearly indicated otherwise by the context, "X includes A, B, and/or C" is intended to mean that X can include any combinations of A, B, and C. In other words, if X includes A; X includes B; X includes C; X includes both A and B; X includes both B and C; X includes both A and C; or X includes all of A, B, and C, then "X includes A, B, and/or C" is satisfied under any of the foregoing instances. Similarly, "X includes at least one of A, B, and C" is intended to be used as an equivalent of "X includes A, B, and/or C."

The use of the terms "including" or "having" and variations thereof herein is meant to encompass the items listed thereafter and equivalents thereof as well as additional items. Depending on the context, the word "if" as used herein can be interpreted as "when," "while," or "in response to."

The use of the terms "a" and "an" and "the" and similar referents in the context of describing the disclosure (especially in the context of the following claims) should be construed to cover both the singular and the plural. Furthermore, unless otherwise indicated herein, the recitation of ranges of values herein is intended merely to serve as a shorthand method of referring individually to each separate value falling within the range, and each separate value is incorporated into the specification as if it were individually recited herein. Finally, the operations of all methods described herein are performable in any suitable order unless otherwise indicated herein or otherwise clearly contradicted by the context. The use of any and all examples, or language indicating that an example is being described (e.g., "such as"), provided herein is intended merely to better illuminate the disclosure and does not pose a limitation on the scope of the disclosure unless otherwise claimed.

This specification has been set forth with various headings and subheadings. These are included to enhance readability and ease the process of finding and referencing material in the specification. These headings and subheadings are not intended, and should not be used, to affect the interpretation of the claims or limit their scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A device, comprising:
    a memory; and
    a processor, the processor configured to execute instructions stored in the memory to:
        obtain respective bandwidth information of respective connected devices of active media sessions;
        detect that at least one additional media session became active;
        determine a first total bandwidth of the at least one additional media session;
        determine at least one scaling factor using the respective bandwidth information and the first total bandwidth, wherein the at least one scaling factor is determined so as to keep a second total bandwidth of the active media sessions and the at least one additional media session below or equal an upper bandwidth limit of a communications network; and
        transmit the at least one scaling factor to at least one connected device of the at least one of the respective connected devices.

2. The device of claim 1, wherein the instructions to determine the at least one scaling factor using the respective bandwidth information and the first total bandwidth comprises instructions to solve an optimization problem defined by $$b' = \left[\sum_{c=1}^{N} \sum_{k=1}^{K_c} f_i^c(s * b_{c,i})\right] + \Delta_{new} \text{ subject to } b' \leq B,$$

wherein s is the at least one scaling factor, N is a number of the active media sessions, $K_c$ is a number of devices connected to a media session c, $b_{c,i}$ is an uplink bitrate of a device i in media session c, B is the upper bandwidth limit of the communications network, b' is the second total bandwidth, $f_i^c$ is a function indicative of a bandwidth incurred by the device i in session c, and $\Delta_{new}$ is the first total bandwidth.

3. The device of claim 2, wherein the at least one scaling factor s comprises respective scaling factors $s_c$ for each of the respective connected devices of the active media sessions.

4. The device of claim 1, wherein the instructions to obtain the respective bandwidth information of the respective connected devices comprise instructions to:
obtain respective uplink bitrate values from the respective connected devices; and
calculate the respective bandwidth information using the respective uplink bitrate values.

5. The device of claim 1,
wherein the active media sessions comprise a first media session and a second media session, and
wherein the instructions to transmit the at least one scaling factor to the at least one connected device comprise instructions to:
transmit the at least one scaling factor to the first media session and to the second media session.

6. The device of claim 1, wherein the instructions to determine the at least one scaling factor comprise instructions to:
obtain respective scaling factors of at least some of the active media sessions by optimizing a total value that is a combination of respective value functions of the active media sessions, wherein each of the respective value functions uses a respective scaling factor and respective bit rates of user devices of a media session as parameters.

7. The device of claim 6, wherein non-media data are excluded from calculations of the respective value functions.

8. A non-transitory computer readable medium storing instructions operable to cause one or more processors to perform operations to:
obtain a first uplink bandwidth of a first user device connected to a first media session;
obtain a second uplink bandwidth of a second user device connected to a second media session; and
in response to detecting that a third media session is started:
calculate at least one scaling factor using the first uplink bandwidth and the second uplink bandwidth; and
transmit the at least one scaling factor to the first user device.

9. The non-transitory computer readable medium of claim 8, wherein the at least one scaling factor is a first at least one scaling factor, and wherein the operations further comprise to:
in response to detecting a change in a number of connected devices in the first media session:
calculate a second at least one scaling factor using the first uplink bandwidth and the second uplink bandwidth, wherein the second at least one scaling factor comprises a scaling factor that is greater than 1; and
transmit the second at least one scaling factor to the second user device.

10. The non-transitory computer readable medium of claim 8, wherein the at least one scaling factor is a first at least one scaling factor, and wherein the operations further comprise to:
in response to detecting that a fourth media session is terminated:
calculate a second at least one scaling factor using the first uplink bandwidth and the second uplink bandwidth; and
transmit the second at least one scaling factor to the first user device.

11. The non-transitory computer readable medium of claim 8, wherein the operations further comprise to:
transmit the at least one scaling factor to the second user device.

12. The non-transitory computer readable medium of claim 8,
wherein the at least one scaling factor comprises a first scaling factor for the first media session and a second scaling factor for the second media session, and
wherein to transmit the at least one scaling factor to the first user device comprises to:
transmit the first scaling factor to the first user device; and
transmit the second scaling factor to the second user device.

13. The non-transitory computer readable medium of claim 8, wherein to calculate the at least one scaling factor comprises to:
calculate the at least one scaling factor using a total bandwidth of a communication network and a capacity of the third media session.

14. The non-transitory computer readable medium of claim 8, wherein the at least one scaling factor is calculated such that a new total network capacity is less than or equal to upper limit of a network system bandwidth, wherein the new total network capacity comprises a first total capacity of the first media session, a second total capacity of the second media session, and a third total capacity of the third media session.

15. The non-transitory computer readable medium of claim 8, wherein to calculate the at least one scaling factor using the first uplink bandwidth and the second uplink bandwidth comprise to:
optimize a value that measures a user experience.

16. The non-transitory computer readable medium of claim 15, wherein the value that measures the user experience is a function of bit rate.

17. A method, comprising:
encoding, at a device, a first portion of a media stream using a first value of an encoding parameter;
transmitting bandwidth information of the device to a control node of a video communications network;
receiving, from the control node, a scaling factor;
scaling an uplink bandwidth of the device using the scaling factor to obtain a second bitrate; and
encoding a second portion of the media stream using a second value of the encoding parameter that is different from the first value of the encoding parameter, wherein the second value is obtained using the first value and the scaling factor.

18. The method of claim 17, wherein the encoding parameter comprises a bitrate value.

19. The method of claim 17, wherein the encoding parameter is at least one of a frame rate or a frame resolution.

20. The method of claim 17, wherein the bandwidth information is transmitted to the control node in response to receiving a request from the control node for the bandwidth information.

* * * * *